H. SCHWEITER.
FEELER FOR COP WINDING MACHINES.
APPLICATION FILED OCT. 9, 1912.
1,085,498.
Patented Jan. 27, 1914.
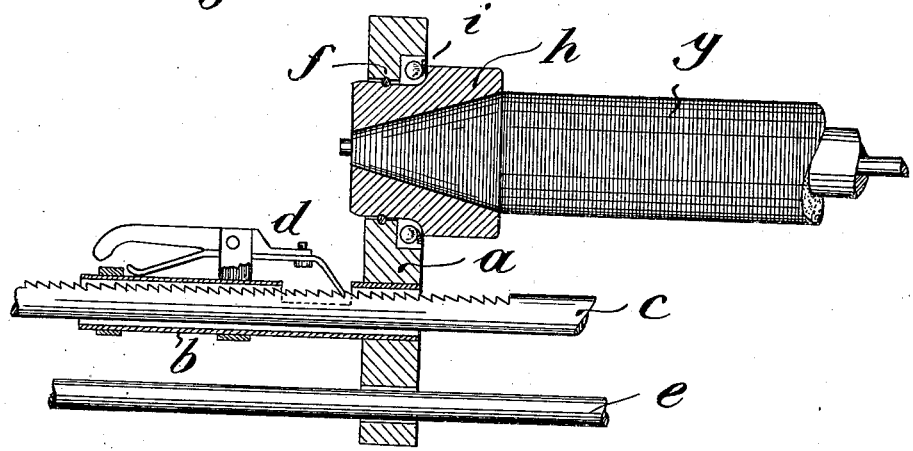
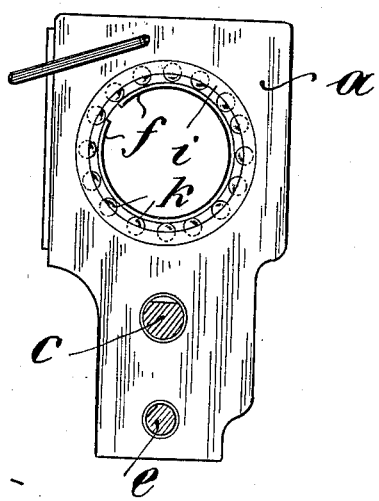
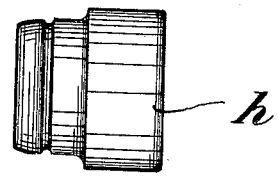
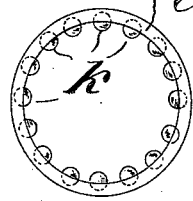
Witnesses—
Robert J. Hulszer
Edith C. Tate
Inventor
Hans Schweiter
by Byrnes Townsend & Brickenstein
attys.

UNITED STATES PATENT OFFICE.

HANS SCHWEITER, OF HORGEN, NEAR ZURICH, SWITZERLAND.

FEELER FOR COP-WINDING MACHINES.

1,085,498.  Specification of Letters Patent.  Patented Jan. 27, 1914.

Application filed October 9, 1912.  Serial No. 724,828.

*To all whom it may concern:*

Be it known that I, HANS SCHWEITER, engineer, a citizen of the Swiss Confederation, residing at No. 525 Lindenstrasse, Horgen, near Zurich, Switzerland, have invented certain new and useful Improvements in Feelers for Cop-Winding Machines, of which the following is a specification.

With certain kinds of cop winding machines a socalled feeler is employed for each cop to be wound. This feeler has a hollow cone running in ball bearings, which determines the diameter of the cop. For admitting of winding cops of different diameters this hollow cone is made exchangeable. The ball bearings besides have to be made so that they can be removed and cleaned, as they are easily filled and choked by the flyings. With the feelers hitherto employed this exchanging of the hollow cones and the cleaning of the ball bearings could be carried out by skilled persons only, and besides required much time, whereby the maintenance of these machines was rendered expensive. These disadvantages are remedied by the present invention according to which the hollow cone journaled in a ball bearing is held by a spring clamp and the said ball bearing is formed by a ring which is notched to receive the balls. In consequence of such arrangement it is possible to instantaneously exchange both the hollow cone and also the ball bearing without requiring skilled labor.

In the accompanying drawing a constructional form of a feeler according to the present invention is exemplified.

Figures 1 and 2 are a longitudinal section and front elevation respectively. Fig. 3 is a side elevation of the hollow cone, and Fig. 4 is a view of the cage ring for the balls.

In the drawing $a$ is the feeler body, which is fitted in known manner on a sleeve $b$, which is displaceable on a rack $c$ coupled to the winding frame, when the ratchet gear $d$ is disengaged. $e$ is another guide rod for the feeler body. The upper part of the latter is bored and grooved to receive a spring ring $f$ working in the manner of a clamping device Figs. 1 and 2. The hollow cone $h$ intended to receive the point of the cop $g$ has a corresponding groove, into which the ring $f$ will engage when the hollow cone is pressed into the body $a$. The ball bearing consists as said above of a notched ring $i$, in the notches of which the balls $k$ are placed, and which is fitted in such a manner in a recess of the body $a$, that the hollow cone can move freely therein.

For exchanging the hollow cone $h$, it need only be withdrawn from the body $a$. When this has been done also the cage ring can be easily removed and cleaned. When the hollow cone or another is to be again refitted, the cage ring is first put back into its place and the respective hollow cone is simply pressed into engagement with the spring ring $f$. In place of the spring ring $f$ also any other suitable clamping device may be employed, without leaving the scope of the present invention.

I claim:

1. In a cop-winding machine, the combination of a feeler-carrier, movable along the axis of the cop, and having therein an opening, a hollow cone-feeler having a portion extending into said opening, said portion and the wall of said opening having registering grooves therein, a spring-retaining ring in said grooves and a detachable ball-bearing mounted between said cone-feeler and the feeler-carrier.

2. In a cop-winding machine the combination of a feeler-carrier, movable along the axis of the cop, and having therein an opening, a hollow cone-feeler having a portion extending into said opening, said portion and the wall of said opening having between them resilient means for detachably and rotatably holding the cone-feeler, and a detachable ball-bearing mounted between said cone-feeler and the feeler-carrier.

In testimony whereof I affix my signature in presence of two witnesses.

HANS SCHWEITER.

Witnesses:
H. BAUMGARTNER,
JAC SURBER.

---

Copies of this patent may be obtained for five cents each, by addressing the "Commissioner of Patents, Washington, D. C."